United States Patent [19]
Krasutsky et al.

[11] Patent Number: 5,285,461
[45] Date of Patent: Feb. 8, 1994

[54] IMPROVED LASER RADAR TRANSCEIVER

[75] Inventors: Nicholas J. Krasutsky, Farmers Branch; Lewis G. Minor, Arlington, both of Tex.

[73] Assignee: Loral Vought Systems Corporation, Grand Prairie, Tex.

[21] Appl. No.: 62,932

[22] Filed: May 17, 1993

Related U.S. Application Data

[63] Continuation of Ser. No. 724,750, Jul. 2, 1991, Pat. No. 5,224,109.

[51] Int. Cl.⁵ .............................................. H01S 3/093
[52] U.S. Cl. ........................................ 372/29; 372/33; 250/234
[58] Field of Search ................... 372/9, 24, 29, 33, 69, 372/70, 75, 705; 250/200, 201.1, 201.2, 203.1, 203.3, 234

[56] References Cited

U.S. PATENT DOCUMENTS

| | | | |
|---|---|---|---|
| Re. 33,228 | 6/1990 | Buchtel et al. | 350/567 |
| 3,782,667 | 1/1974 | Miller, Jr. et al. | 244/3.13 |
| 4,024,392 | 5/1977 | Teppe et al. | 250/234 |
| 4,197,006 | 4/1980 | Maillet | 356/5 |
| 4,404,592 | 9/1983 | Pepin et al. | 358/125 |
| 4,590,375 | 5/1986 | Rovati et al. | 250/348 |
| 4,647,761 | 3/1987 | Cojan et al. | 250/203 R |
| 4,656,349 | 4/1987 | Pinson et al. | 250/203 R |
| 4,698,498 | 10/1987 | Mahoney et al. | 250/234 |
| 4,770,482 | 9/1988 | Sweeney et al. | 244/3.16 X |
| 4,812,639 | 3/1989 | Byren et al. | 250/203 R |
| 4,853,528 | 8/1989 | Byren et al. | 250/203 R |
| 4,879,460 | 11/1989 | Schleimann-Jensen et al. | 250/203 R |
| 4,890,289 | 12/1989 | Basu et al. | 372/33 |
| 4,952,042 | 8/1990 | Pinson | 350/567 |
| 5,134,426 | 7/1992 | Kataoka et al. | 346/108 |
| 5,224,109 | 6/1993 | Krasutsky et al. | 372/29 |

FOREIGN PATENT DOCUMENTS

| | | |
|---|---|---|
| 0050539 | 4/1982 | European Pat. Off. . |
| 0127870 | 12/1984 | European Pat. Off. . |
| 4009962 | 10/1990 | Fed. Rep. of Germany . |
| 2228338 | 8/1990 | United Kingdom . |

*Primary Examiner*—Akm E. Ullah
*Attorney, Agent, or Firm*—Arnold, White & Durkee

[57] ABSTRACT

A gimballed optical system within a seeker head includes a relatively low power laser coupled to a relatively higher power laser by way of a flexible fiber optic cable to reduce the mass that must be oscillated in a scan.

11 Claims, 5 Drawing Sheets

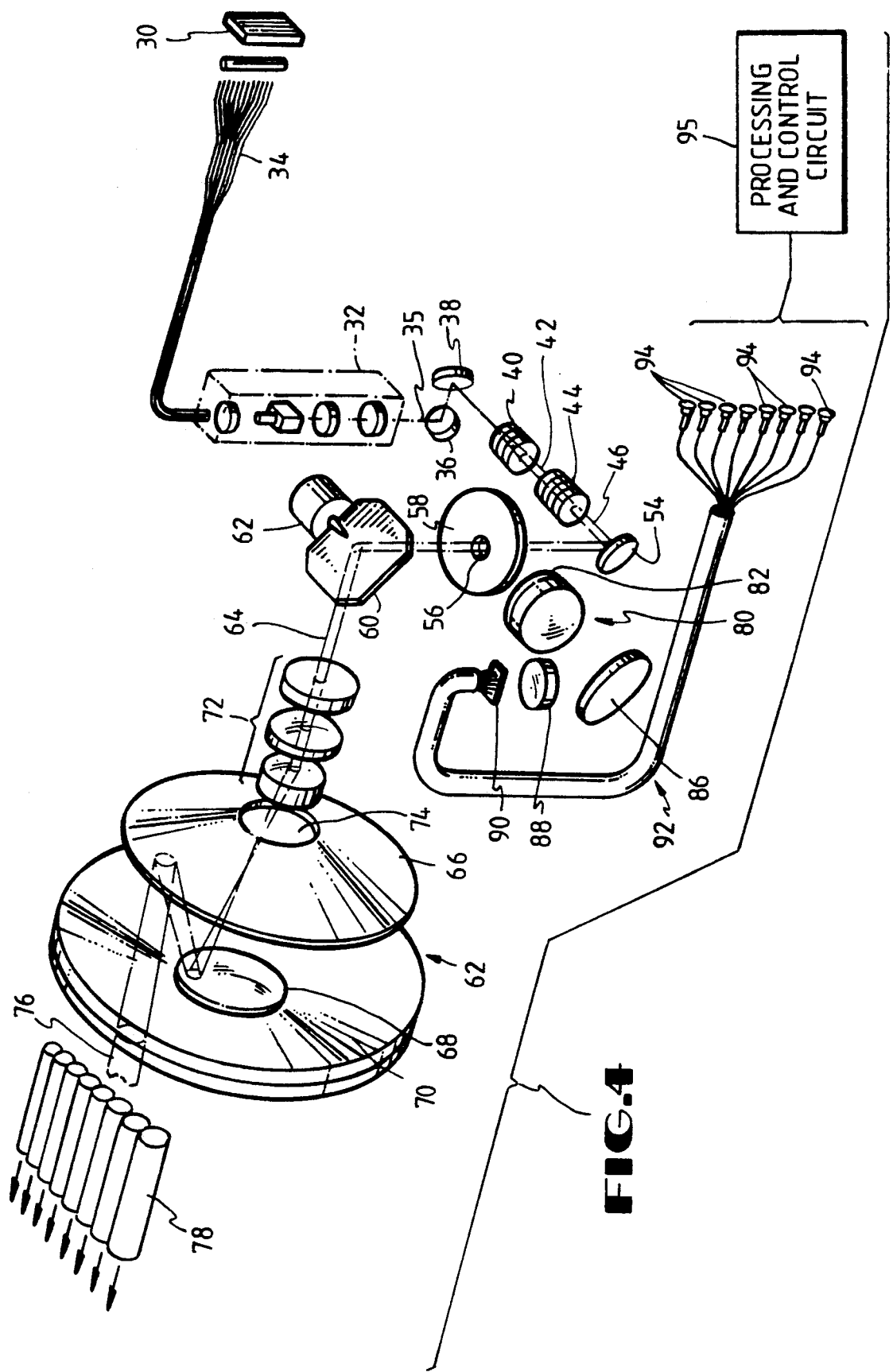

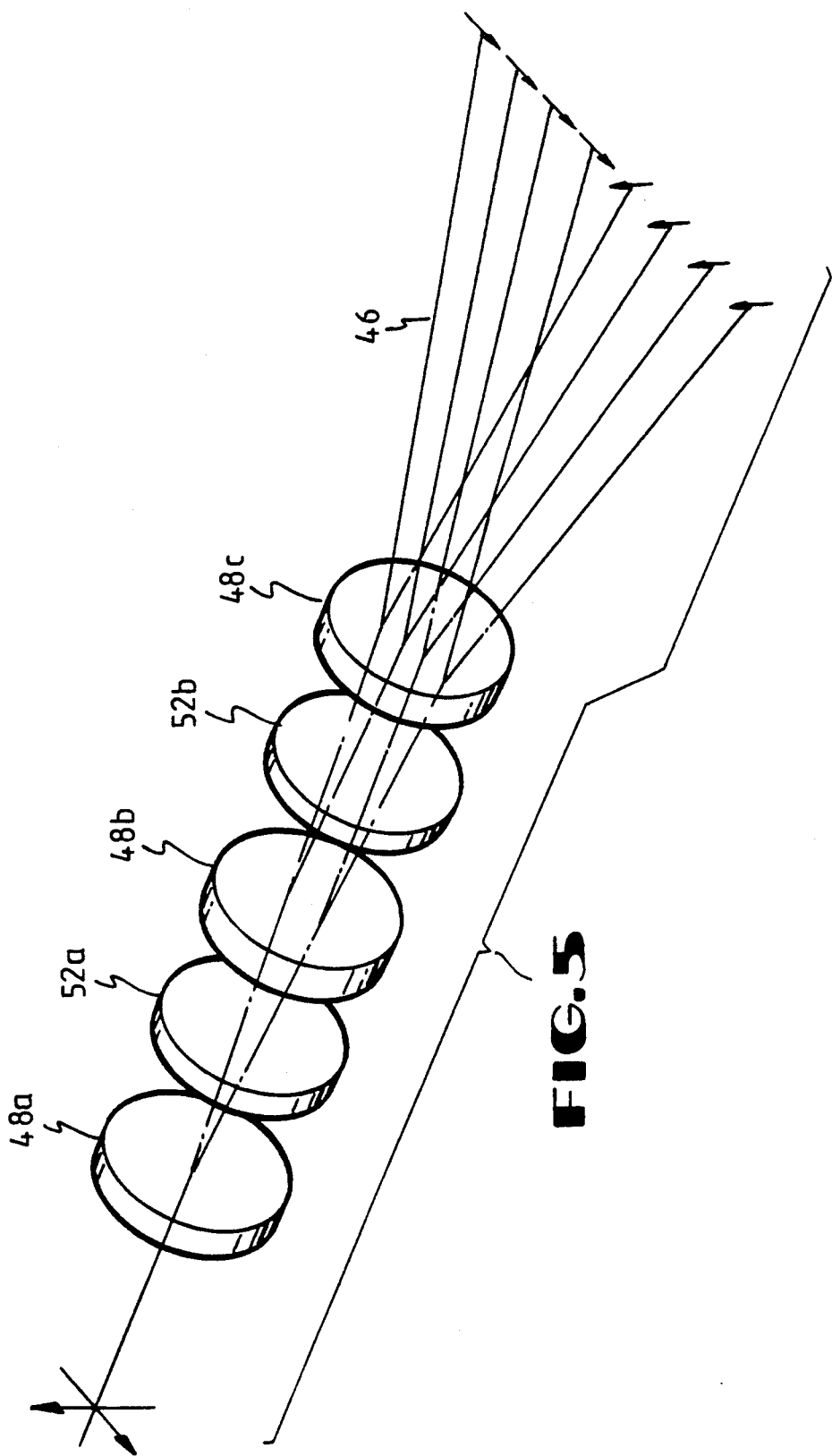

IMPROVED LASER RADAR TRANSCEIVER

This application is a continuation of application Ser. No. 07/724,750, filed Jul. 2, 1991, now U.S. Pat. No. 5,224,109.

BACKGROUND OF THE INVENTION

The present invention relates to a laser radar ("LADAR") seeker and guidance system adapted to scan a target area with laser energy, detect the reflected laser energy, and compute range and intensity values, permitting the processing of guidance and control signals for the missile as it approaches the target.

As shown in U.S. Pat. No. 4,024,392, gimbaled laser seekers are known. However, such gimbaled seekers require numerous and complex components to be mounted within the gimbaled assembly. This calls for large and heavy drive motors which further increases the weight of the entire assembly.

Thus, there remains a needs for a laser seeker head that minimizes the components that must be driven by a gimbal drive system to scan and detect a target of interest.

BRIEF DESCRIPTION OF THE INVENTION

In a prefered embodiment, the present invention is used as a missile guidance system to identify and home in on a military target. The system is capable of generating three dimensional images of target areas by ranging on points in the imaged scene. Processing electronics are employed for actuating a LADAR transmitter and for processing the laser signals reflected from the target area. The processing system determines where a target is located, identifies the target, and provides guidance signal information such as line-of-sight rate, range, range rate, and a relative position vector (delta x, y, and z). Range and intensity information is generated for a two-dimensional array of points scanned by the LADAR seeker. Range data is obtained by measuring the time delay between transmitted and received laser light pulses emitted by the seeker. The pulses are provided by a Q-switched, solid-state laser, such as Nd:YLF, Nd:YAG, or Nd:YVO$_4$ laser for example, pumped by an external, remotely located diode laser, for example GaAlAs diode laser.

The GaAlAs diode activating laser and its associated power supply is fixedly mounted to the vehicle housing, off of the frame holding the gimbaled optics components. Similarly, the detection and processing components are mounted away from the gimbaled components, thus reducing the mass that must be oscillated to scan the laser beam. This substantially reduces the weight of the drive components, reduces costs, and substantially simplifies assembly.

BRIEF DESCRIPTION OF THE DRAWING FIGURES

FIG. 4 is an exploded view of several components of the optical train of the apparatus of FIGS. 1-3; and FIG. 5 is an exploded view of the beam segmenter of the apparatus of FIGS. 1-4.

DETAILED DESCRIPTION OF A PREFERRED EMBODIMENT

Figure 1:
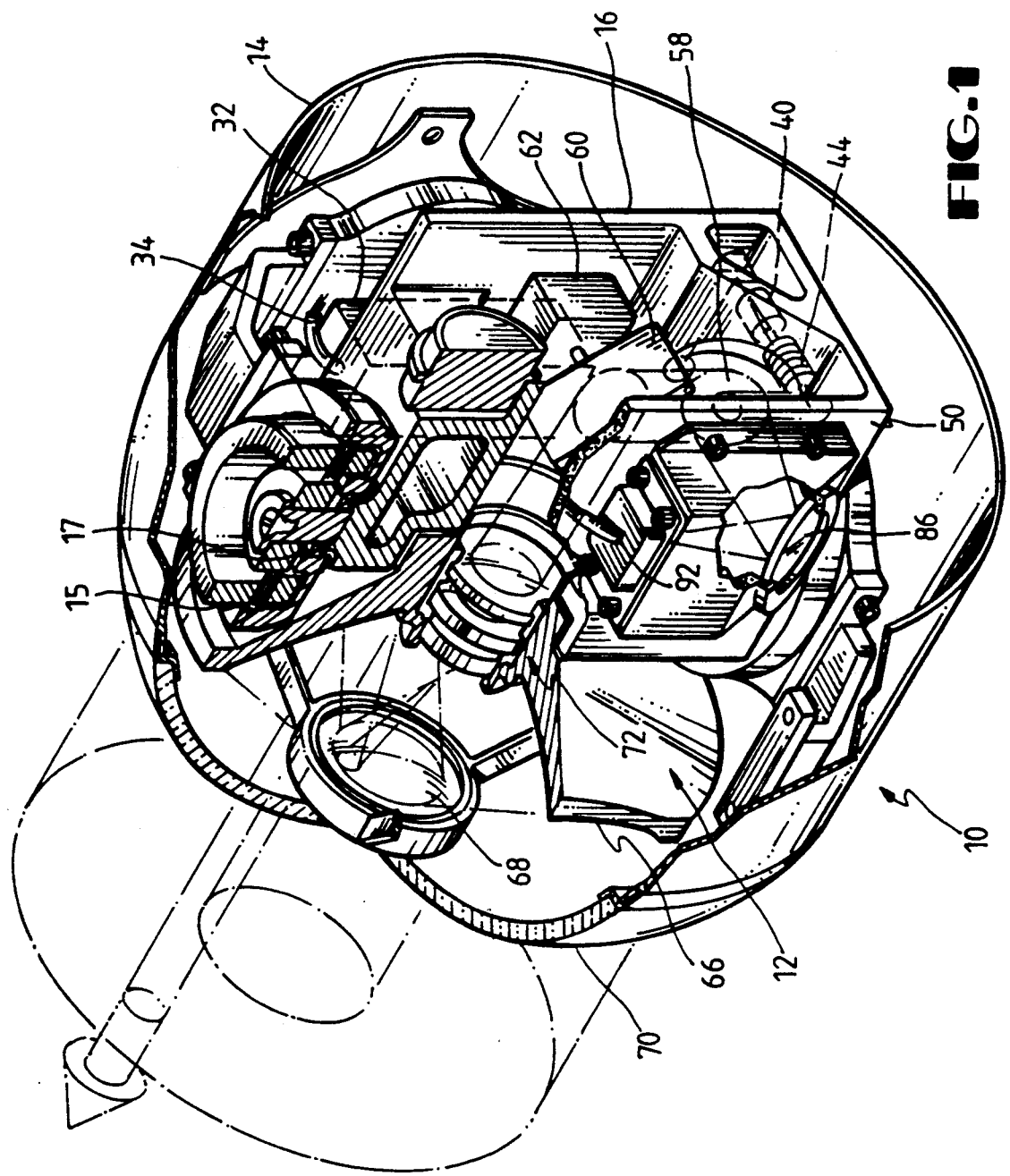
FIG. 1 is a perspective view, partially broken away and partially in section, of the sensor head and LADAR transceiver optics.

FIG. 1 depicts a LADAR seeker head 10 that may employ the present invention. The LADAR seeker head 10 includes an optical system 12 which is gimbal mounted for pivotal movement within an outer housing 14. The outer housing 14 is non-movably mounted within the forward end portion of a missile or other vehicle, not shown. The seeker head further includes a gimbaled frame 16 on which the movable members within the seeker head are mounted.

Figure 2:
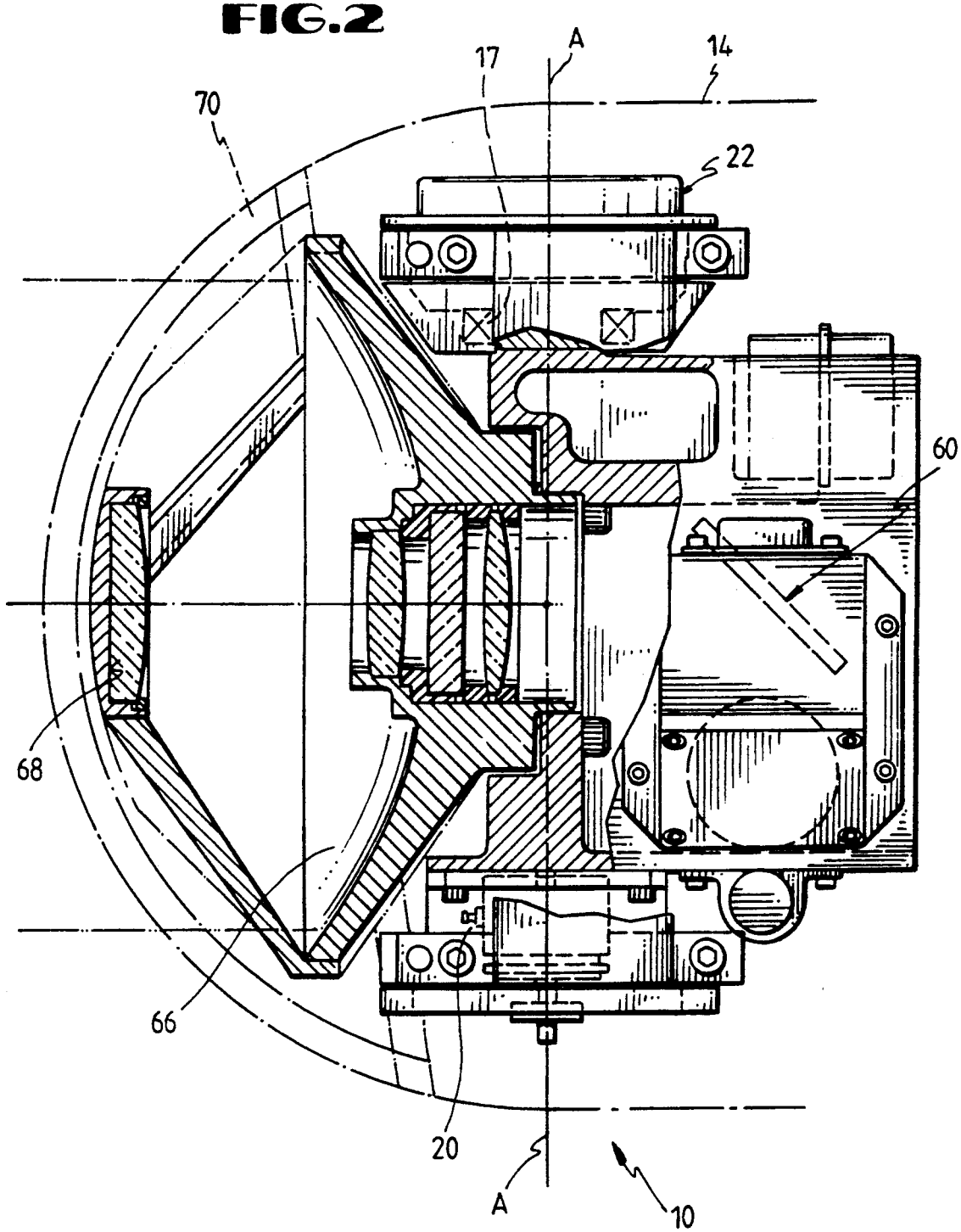
FIG. 2 is an elevation, sectional view of the apparatus of FIG. 1.

FIG. 2 depicts an elevation view of the seeker head 10. The optical system 12 is pivotally supported by upper and lower bearing assemblies 18, 20, respectively, for permitting yaw movement of the optical system within the housing 14. A servo controlled azimuth drive motor 22 is connected to drive the optical system about an axis A ($\pm 22.5$ degrees).

Figure 3:
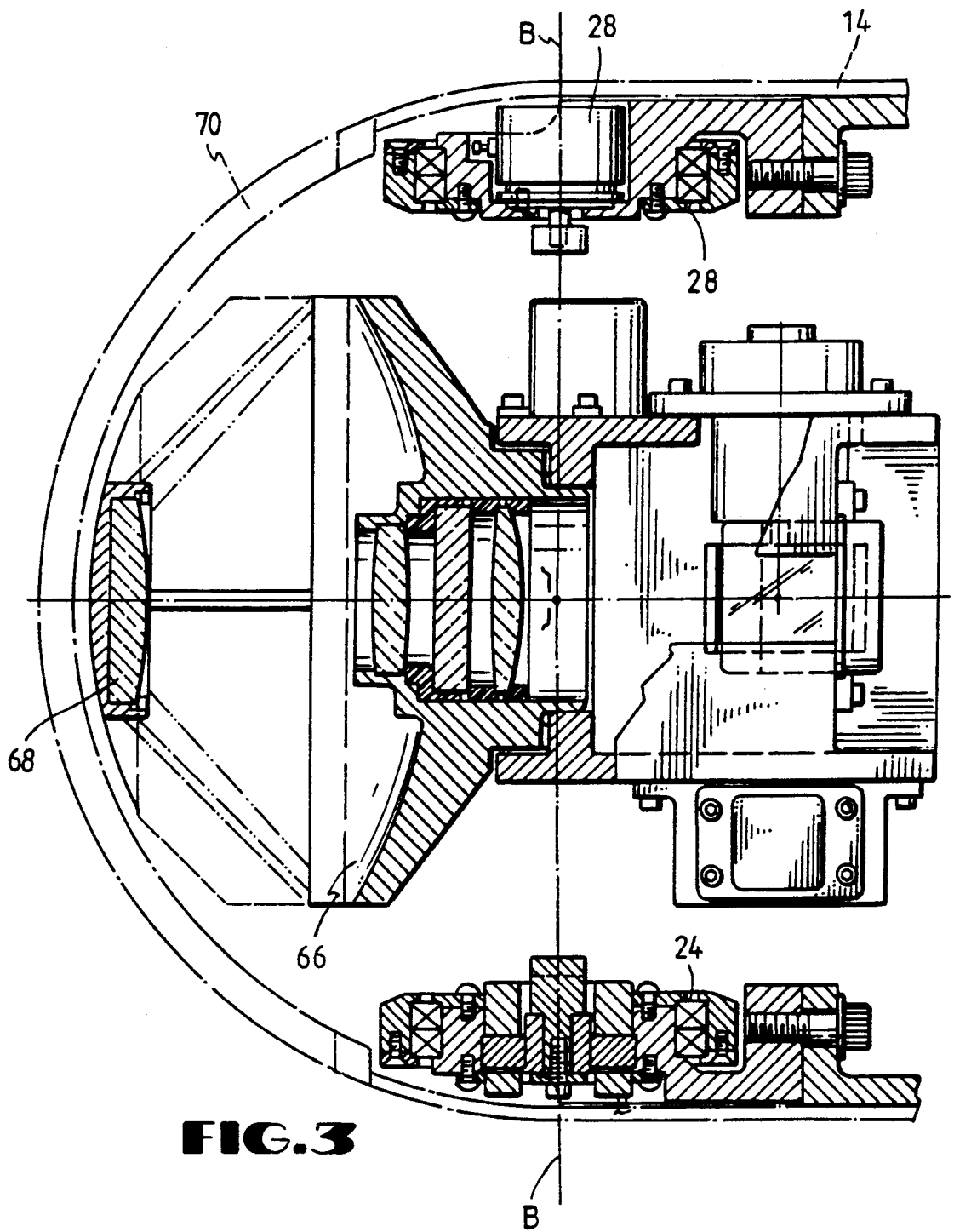
FIG. 3 is a sectional view of the apparatus of FIGS. 1 and 2 taken as on line III—III of FIG. 2.

FIG. 3 depicts a further sectional view of the seeker head 10, taken along the section line III—III of FIG. 2. The outer housing 14 contains left and right bearing assemblies 24, 26 which are similarly mounted on the housing 14 for pivotally supporting the optical system, permitting pitch movement of the optical system 12 about an axis B. The optical system 12 is pivoted about normally horizontal axis B by a servo controlled scanning motor 28, which, in the preferred embodiment, is operable to scan the system through an arc of $\pm$ thirty degrees from a central transmission axis.

FIG. 4 provides and exploded view of some of the optics of the seeker head 10. A gallium aluminum arsenide laser 30 pumps a solid state laser 32, which is mounted on the gimballed optical system 12 and which emits the laser light energy employed for illuminating the target. The GaAlAs pumping laser 30 produces a continuous signal of wavelengths suitable for pumping the solid state laser 32, e.g., in the crystal absorption bandwidth. Pumping laser 30 has an output power, suitably in the 10-20 watt range, sufficient to actuate the solid state laser 32. The pumping laser 30 is fixedly mounted on the housing 14, whereas the solid state laser 32 is mounted on the gimballed frame 16 for movement with the optical system 12. Output signals from the pumping laser are transmitted through an input lens and through a fiber optic bundle 34 which has sufficient flexibility to permit scanning movement of the seeker head during operation.

The solid state laser 32 is suitably a Neodymium doped yttrium aluminum garnet (YAG), a yttrium lithium fluoride (YLF), or Nd:YVO$_4$ laser operable to produce pulses with widths of 10 to 20 nanoseconds, peak power levels of approximately 10 kilowatts, at repetition rates of 10-120 KHz. The equivalent average power is in the range of 1 to 4 watts. The preferred range of wavelengths of the output radiation is in the near infrared range, e.g., 1047 or 1.064 microns.

As seen most clearly in FIG. 4, the output beam 35 generated by solid state laser 32, in the present embodiment, is successively reflected from first and second turning mirrors 36 and 38 to beam expander 40. The beam expander 40 comprises a series of (negative and positive) lenses which are adapted to expand the diameter of the beam to provide an expanded beam 42, suitably by an 8:1 ratio, while decreasing the divergence of the beam.

The expanded beam 42 is next passed through a beam segmenter 44 for dividing the beam into a plurality of beam segments 46 arrayed on a common plane, initially overlapping, and diverging in a fan shaped array. The divergence of the segmented beams 46 is not so great as to produce separation of the beams within the optical system 12, but preferably is sufficiently great to provide a small degree of separation at the target, as the fan-shaped beam array is scanned back and forth over the target (as will be described below with reference to output beam segments 48).

FIG. 5 depicts the physical construction of the segmenter 44. Preferably, a plurality of calcite wedges 48a, 48b, and 48c of approximately 5 to 7 mm. diameter is provided, the wedges being supported within a suitable housing 50 (FIG. 1) mounted on the gimbaled frame 16 and positioned in coaxial alignment with the expanded beam 42 emitted from the beam expander 40. The prefered embodiment employs three wedges, each operable as a bi-refringent crystal to divide a circularly polarized beam into two linearly polarized beams, one vertically polarized and one horizontally polarized as shown in FIG. 5, and travelling at slightly different angles. First and second ¼ wave retarders 52a and 52b are interposed between respective adjacent pairs of the calcite wedges 48 for changing the linearly polarized beams, produced by the wedges, back to circularly polarized beams before entering the next wedge, in order to split up each beam once again. Other beam segmentation methods are also possible provided they allow for overlapping beams, e.g. holographic diffraction gratings.

As shown in FIG. 4, the resultant segmented beams 46 are then reflected from a third turning mirror 54, passed through an aperture 56 of an apertured mirror 58, and subsequently reflected from a scanning mirror 60 in a forward direction relative to the missile. The apertured 56 must be located off the center of the aperture mirror 58. The scanning mirror 60 is pivotally driven by a scanning drive motor 62, which is operable to cyclically scan the beam segments 46 for scanning the target area. In a preferred embodiment, the beam segments 46 are preferably scanned at a rate of approximately 100 Hz. The turning axis of the scanning motor is aligned in parallel with the segmenter wedges whereby the resultant beam array is scanned perpendicularly to the plane in which the beams are aligned.

An afocal, Cassegrainian telescope 62 is provided for further expanding an emitted beam 64 and reducing its divergence. The telescope 62 includes a forwardly facing primary mirror 66 and a rearwardly facing secondary mirror 68. A protective outer dome 70, of a suitable transparent plastic or glass material such as BK-7 is mounted forwardly of the secondary mirror 68. A lens structure 72 is mounted in coaxial alignment between the primary mirror 66 and the scanning mirror 60, and an aperture 74 is formed centrally through the primary mirror in alignment with the lens structure. The transmitted beams which are reflected from the scanning mirror are directed through the lens structure 72 for beam shaping, subsequently directed through the aperture 74 formed centrally through the primary mirror, and subsequently reflected from the secondary mirror 68 spaced forwardly of the primary mirror and is then reflected from the front surface of the primary mirror 66. The resultant transmitted beam 76, is a fan shaped array which is scanned about an axis parallel to its plane. The beam array 78 illustrates the diverged spacing of the beam segments as they reach the target, wherein the beams are in side-by-side orientation, mutually spaced by a center-to-center distance of twice their diameters.

The telescope 62 receives laser energy reflected from a target that has been illuminated by the array of transmitted beams. This received energy is then reflected successively through the primary mirror 66 and the secondary mirror 68, the lens assembly 72, and the scanning mirror 66, toward the apertured mirror 58. Because the reflected beam is of substantially larger cross-sectional area than the transmitted beam, it is incident upon the entire reflecting surface of the apertured mirror 58, and substantially all of its energy is thus reflected laterally by the apertured mirror toward collection optics 80. The collection optics 80 includes a narrow band filter 82, for filtering out wave lengths of light above and below a desired laser wavelength to reduce background interference from ambient light. The beam then passes through condensing optics 84 to focus the beam. The beam next strikes a fourth turning mirror 86 toward a focusing lens structure 88 adapted to focus the beam upon the receiving ends 90 of a light collection fiber optic bundle 92. The opposite ends of each optical fiber 92 are connected to illuminate a set of diodes 94 in a detector array, whereby the laser light signals are converted to electrical signals which are conducted to a processing and control circuit a5.

The fiber optic bundle 92 preferably includes nine fibers, eight of which are used for respectively receiving laser light corresponding to respective transmitted beam segments and one of which views scattered light from the transmitted pulse to provide a timing start pulse. Accordingly, the input ends 90 of the fibers 92 are mounted in linear alignment along an axis which is perpendicular to the optical axis. The respective voltage outputs of the detectors 94 thus correspond to the intensity of the laser radiation reflected from mutually parallel linear segments of the target area which is parallel to the direction of scan.

The detection system and circuitry are fixedly mounted relative to the housing or other suitable supporting structure aboard the missile, whereby the scanning and azimuth translations of the seeker head do not affect corresponding movement of the detection system. Accordingly, the mass of the components which are translated during scanning is substantially lower than would be the case if all components were gimbal mounted.

FIG. 1 depicts the preferred structure of the components of FIG. 4. The flexible fiber optic cable 34 carries activating energy to the solid state laser 32. After striking the first turning mirror 36 and the second turning mirror 38 (not shown in FIG. 1), the emitted laser beam passes through a beam expander 40 and a beam segmenter 44. After striking the third turning mirror 54, the beam passes through the apertured mirror 58 and onto the scanning mirror 60 which is driven by the scanning motor 62. The lens structure 72 then directs the beam onto the secondary mirror 68 which reflects the beam onto the primary mirror 66. The beam, which is now a fan shaped array but shown schematically in FIG. 1 as an arrow head, passes through the transparent outer dome 70 toward a target.

Energy reflected from a target is shown schematically in FIG. 1 as a donut shaped beam. It is shown this way because the secondary mirror 68 will block a minor portion of the return energy. The incoming beam follows the same path as the outgoing beam until the expanded beam strikes the apertured mirror 58. There, the beam is directed onto the fourth folding mirror 86 and from there to the receiving ends 90 of the fiber optic bundle 92.

While the present invention has been described in connection with a preferred embodiment, those of ordinary skill in the art will recognize many modifications to the present invention and this application is intended to cover any adaptations or variations of the invention.

We claim:

1. A laser radar transceiver comprising:
   a sensor apparatus having a frame movable coupled to a housing;
   a laser actuating device being located remote from said sensor apparatus;
   a laser beam emitting device being disposed on said frame for movement therewith and being operatively coupled to said laser actuating device, said laser beam emitting device being adapted to emit a laser beam along a first optical path in response to receiving energy from said laser actuating device;
   an optical system being disposed on said frame for movement therewith and being adapted to transmit said laser beam and to receive reflections of said transmitted laser beam, said optical system comprising:
   a beam expander in the first optical path for expanding and collimating said laser beam;
   a beam segmenter comprising a plurality of beam segmenter wedges for segmenting said laser beam into a plurality of laser beams, the beam segmenter having an output axis;
   a device located along the output axis of the beam segmenter to direct the plurality of laser beams along a second optical path;
   an apertured reflector device located along the second optical path and having an aperture positioned to permit the plurality of laser beams to pass therethrough;
   a scanning device located along the second optical path, said scanning device being adapted to scan the plurality of laser beams in a pattern, to receive reflected laser light from a target, and to direct the reflected laser light onto the apertured reflector device along a third optical path; and
   a signal processing circuit being located remote from said sensor apparatus and being operatively coupled to said optical system, said signal processing circuit being adapted to process said reflected laser light.

2. The transceiver, as set forth in claim 1, comprising: a gimbal coupling said frame to said housing.

3. The transceiver, as set forth in claim 1; wherein said gimbal facilitates pivotal movement of said frame with respect to said housing about a first axis and about a second axis, said second axis being substantially perpendicular to said first axis.

4. The transceiver, as set forth in claim 1, wherein said beam segmenter comprises:

a plurality of calcite wedges each being operable as a bi-refringent crystal to divide a circularly polarized beam into two linearly polarized beams; and
a plurality of ¼ wave retarders each interposed between adjacent pairs of said calcite wedges.

5. The transceiver, as set forth in claim 1, wherein said beam expander comprises:
a series of negative and positive lenses that expand the diameter of said laser beam.

6. A laser radar transceiver comprising:
   a sensor head having a housing and a frame, said frame being movably coupled to said housing;
   a laser actuating device being located remote from said sensor head;
   a laser beam emitting device being disposed on said frame for movement therewith aand being operatively coupled to said laser actuating device, said laser beam emitting device being adapted to emit a laser beam in response to receiving energy from said laser actuating device;
   a beam segmenter being disposed on said frame for movement therewith and being positioned to receive said laser beam and to segment said laser beam into a plurality of diverging laser beams;
   an optical system being disposed on said frame for movement therewith, said optical system having transmission optics for transmitting said plurality of diverging laser beams toward a target area wherein the divergence of said laser beams does not produce separation of said laser beams within said transmission optics, and having collection optics to receive reflections of said transmitted plurality of laser beams; and a signal processing circuit being located remote from said sensor head and being opreatively coupled to said optical system, said signal processing circuit being adapted to process said received reflections.

7. The transceiver, as set forth in claim 6, comprising:
a gimbal coupling said frame to said housing, wherein said gimbal facilitates pivotal movementt of said frame with respect to said housing about a first axis and about a second axis, said second axis being substantially perpendicular to said first axis.

8. The transceiver, as set forth in claim 7, wherein said gimbal comprises:
a first motor coupled to said housing and said frame to pivot said frame about said first axis; and
a second motor coupled to said housing and said frame to pivot said frame about said second axis.

9. The transceiver, as set forth in claim 6, wherein said laser is selected from a group consisting of a Nd: YAG laser, a Nd: YLF laser, and a ND: YVO$_4$ laser.

10. The transceiver, as set forth in claim 6, wherein said transmission optics comprise a scanner for transmitting said plurality of laser beams along a predetermined path.

11. The transceiver, as set forth in claim 10, wherein said scanner comprises:
a pivotable mirror; and
a third motor coupled to said mirror for controllably pivoting said mirror.

* * * * *